(12) United States Patent
Rakutt et al.

(10) Patent No.: US 7,857,596 B2
(45) Date of Patent: Dec. 28, 2010

(54) VANE OR ROTOR BLADE

(75) Inventors: Dietmar Rakutt, Cham (CH); Lukas Berger, Luzem (CH)

(73) Assignee: Alcan Technology & Management Ltd, Neuhausen am Rheinfall (CH)

( * ) Notice: Subject to any disclaimer, the term of this patent is extended or adjusted under 35 U.S.C. 154(b) by 0 days.

(21) Appl. No.: 12/757,376

(22) Filed: Apr. 9, 2010

(65) Prior Publication Data

US 2010/0254819 A1   Oct. 7, 2010

Related U.S. Application Data

(63) Continuation of application No. 10/524,987, filed as application No. PCT/EP03/09090 on Aug. 16, 2003, now abandoned.

(30) Foreign Application Priority Data

Aug. 29, 2002  (EP)  ................... 02405739

(51) Int. Cl.
  *B32B 3/18*  (2006.01)
  *B32B 5/18*  (2006.01)
(52) U.S. Cl. ................ 416/229 R; 416/241 A
(58) Field of Classification Search ............ 428/54, 428/56, 316.6; 52/309.11; 416/241 A, 229 R
See application file for complete search history.

(56) References Cited

U.S. PATENT DOCUMENTS

| | | |
|---|---|---|
| 3,571,559 A | 3/1971 | Becker |
| 3,841,958 A | 10/1974 | Delorme |
| 4,536,427 A | 8/1985 | Kohn |
| 4,755,408 A | 7/1988 | Noel |
| 4,837,060 A | 6/1989 | Bambara et al. |
| 5,798,160 A | 8/1998 | Kohn |
| 6,213,540 B1 | 4/2001 | Tusim et al. |
| 2004/0001945 A1 | 1/2004 | Cate et al. |

FOREIGN PATENT DOCUMENTS

| | | |
|---|---|---|
| DE | 19715529 C1 | 8/1998 |
| DE | 10036185 A1 | 1/2001 |
| WO | 97/03828 A1 | 2/1997 |

OTHER PUBLICATIONS

Dissertation von Michael Heil: "Heizstrahlerschweissen thermoplastischer Kunststoffe", 1994, Anfang bis einschliesslich Seite 7 and Seite 143 bis 153.

(Continued)

*Primary Examiner*—Alexander Thomas
(74) *Attorney, Agent, or Firm*—Bachman & LaPointe, P.C.

(57) ABSTRACT

An unmixed plastic sheet, which is made of a thermoplastic material and which is composed of a number of body segments that are adjacent to one another in a plane, interconnected and made of a closed-cell foam material. The body segments are thermoplastically welded to one another at their abutting lateral faces while forming flat weld seams. The flat weld seams form a plastic intermediate layer, which has few pores, and which is provided in the form of a web structure that, when viewed from above, is reticular and reinforces the plastic sheet. The inventive plastic sheet is preferably used as a core layer in sandwich composites.

10 Claims, 2 Drawing Sheets

OTHER PUBLICATIONS

Wolfgang et al, Ullmann's Encyclopedia of Industrial Chemistry, Fibers, 5. Synthetic Inorganic, to Formaldehyde, 5th compl. rev. ed. 1988 vol. A11; pp. 436, 438, 439, 448, 460-461.

Elvers et al., Ullmann's Encyclopedia of Industrial Chemistry, Plastics, Properties and Testing to Polyvinyl Compounds, 5th compl. rev. ed. 1992 vol. A21; pp. 232.

Rompp-Lexikon Chemie, 10. Auflage, 1997, Band 3. H-L, S. 2307.

VANE OR ROTOR BLADE

CROSS-REFERENCE TO RELATED APPLICATIONS

This is a continuation of U.S. patent application Ser. No. 10/524,987 filed Feb. 21, 2006, now abandoned, which is A National Stage Application of PCT Application PCT/EP2003/009090 filed on Aug. 16, 2003.

The invention relates to a large area structural element containing a plurality of body segments arranged adjacent to one another in a plane, interconnected and made of a closed-cell foamed plastic, and a process for manufacturing such a large area structural element and the use thereof.

It is known to employ a foamed thermoplastic as the core layer in sandwich-type composites. The production of foamed plastic panels may be achieved e.g. by an extrusion process. The structural load-bearing capacity, in particular the compressive strength of such core layers made using extrusion processes is however limited. For demanding applications, therefore, sandwich composites with the above mentioned core layers are often not suitable as structural components.

However, for demanding applications such as e.g. structural components in transportation it is necessary to have sandwich composites that exhibit a high degree of strength, in particular compressive strength and stiffness, and core materials that exhibit high shear strength and stiffness. In order to achieve these properties, use is made e.g. of stronger and much thicker outer layers. As a rule this leads to an undesireable increase in the specific weight of the sandwich composites. Further, the compressive strength of such sandwich composites can not be increased in an unlimited manner by use of thicker outer layers.

It is therefore desireable not only for the outer layers but also the core layers to exhibit greater compressive and shear strength, however, without having to forego the advantage of smaller thickness of foamed bodies.

This would enable sandwich composites with improved strength and stiffness characteristics to be achieved without significant increase in the specific weight. On the other hand, the use of core layers with increased stiffness and strength would also permit the use of thinner outer layers.

Sandwich composites are therefore known that exhibit improved strength by use of specific design of the core layer.

Described in DE 197 15 529 C1 for example is the production of a sandwich composite with a core layer and outer layers on both sides thereof, whereby the core layer is made up of horizontally abutting polygonals e.g. cube-shaped foam segments. In that case the individual foam segments are covered over with a fibre layer and fitted together in a device such that the sides of the segments are in contact with the fibre layer in a strut-lke manner. The strut-like fibre layers are soaked with an impregnating medium. By hardening the impregnating medium fibre-composite layers are produced between the foam segments, thus providing a stiffening and strengthening effect on the core layer.

The described manufacturing process is, however, found to be very complicated and costly. Further, a core layer produced in accordance with the described process is of a mixed type as the foam segments, fibre layers and impregnating medium result in at least three different materials being used.

The document U.S. Pat. No. 4,837,060 describes a composite element with a core layer of mutually adhesively bonded or sealed cylindrical shaped foam elements with outer layers provided on both sides of the core layer. The axes of the cylinders of the foam elements run parallel to the planes of the outer surface layers.

The document U.S. Pat. No. 4,536,427 describes a composite element with a core layer of mutually adhesively bonded balsa wood elements. The adhesive bond is flexible and elastic in design with the result that the core layer is able to bend.

The object of the present invention is to propose a large area, in particular sheet-like structural element which is suitable for core layers in sandwich-type composites, whereby the structural element should contain a foam with a closed-cell structure. A further object is a cost favourable process for manufacturing the mentioned large area structural element. The large area structural element should in particular exhibit improved compressive strength in comparison with conventional foam panels. The large area structural element should also be as unmixed in character as possible.

That objective is achieved by way of the invention in that the structural element is made wholly of plastic, and the body segments are welded together at their abutting lateral faces forming flat weld seams, whereby the flat weld seams form a plastic intermediate layer which has few pores or is pore-free and which is provided in the form of a web structure that, when viewed from above, is reticular and reinforces the plastic sheet.

The large area structural element is preferably sheet-shaped. The large area structural element is preferably in the form of a sheet-type element, in particular a block-shaped sheet element.

The large area structural element comprises a thermoplastic, preferably a poly-styrene (PS), acrylnitrile/butadiene/styrene-grafted coploymer (ABS). poly-ethylene (PE), polypropylene (PP), polyvinylchloride (PVC), polycarbonate (PC) and in particular polyethylene-terephthalate (PET), poly-phenylene-ether (PPE) or poly-blends thereof such as poly (phenylene-ether)-polystyrene (PPE+FPS), or a styrene/acrylnitrile copolymer (SAN).

The structural element according to the invention is preferably unmixed i.e. it is comprised of only one single plastic. The unmixed character requires in particular that the structural element contains no other kind of adhesive for joining the body segments together.

The specific weight of a structural element according to the invention is e.g. more than 20 kg/m$^3$, preferably more than 40 kg/m$^3$, in particular more than 50 kg/m$^3$ and e.g. less than 200 kg/m$^3$, preferably less than 130 kg/m$^3$. The pore size of the foam is e.g. in the range 100 to 1000 µm.

The weld seams are preferably formed by plastic of the body segment which is melted then solidified after fitting the segments together. To that end the body segments exhibit, in particular at the abutting sides, zones in the form of areas that melt and re-solidify.

The thickness of the weld seams or melt zones is chosen such that the network-like strut structure of the weld seams increases the compressive strength of structural element with respect to area pressure. This means that the weld seams represent not only joins between two body segments, but at the same time stiffening or reinforcing struts of foam between the body segments. The weld seams also effect stiffening of the structural element with respect to shear and bending stresses. The expression of strength or thickness of the weld seams refers therefore not only to a stable weld seam but also to effective stiffening or reinforcing of the structure.

The thickness of the melt/re-solidified zone at the side wall faces that constitute the weld seams is selected therefore such that the structural element exhibits in particular high compressive strength with respect to surface pressure.

The body segments are preferably fitted and welded together in a continuous manner i.e. free of voids. The body segments therefore preferably exhibit a cross-sectional shape that enables the segments to be fitted together in rows without gaps.

In a preferred version of the invention the body segments exhibit—in a plan view of the structural element—a poloygonal shape, in particular an eight, six, four or three sided shape. The body segments may in plan view of the structural element exhibit e.g. a quadratic, rectangular, hexagonal or triangular outline which runs around the so called top faces of the body segments.

The size of the body segments may vary according to the degree of stiffness or compressive strength desired.

As each of the above mentioned geometries and sizes of body segments results in large area structural elements with different properties, the geometry and size of the body segments are determined primarily by the specific requirements placed on the structural element.

The body segments are especially preferably in the form of cubes or blocks. Body segments of block or cube shape may e.g. be arranged in several rows and columns, whereby the weld joints form a network-type structure with intersecting longitudinal and transverse weld seams. The said body segments may also be arranged in several rows that are offset with respect to each other, whereby the weld joints form continuous transverse weld seams and offset longitudinal weld seams creating a pattern like a brick wall.

Quadratic shaped body segments may e.g. (as viewing the structural element in plan view) exhibit a quadratic or rectangular shaped outline with side lengths (x, y) of 20 to 600 mm, preferably 30 to 400 mm, in particular 40 to 100 mm (see also FIG. 1). A rectangular body segment may e.g. (as viewing the structural element in plan view) exhibit a length of 0 to 250 mm and a breadth of 30 to 50 mm.

The body segments may—viewing the structural element in plan view—also exhibit a curved outline shape e.g. concave or convex in whole or in part. The body segments may also be shaped in a manner of interlocking bricks i.e. the body segments are shaped such that the individual body segments lock into each other. The body segments of the structural element according to the invention are also preferably congruent with respect to each other.

In sheet-shaped structural elements the side faces of the body segments are also preferably perpendicular to the outer faces of the structural element.

The invention also relates to a process for manufacturing a large area structural element containing a plurality of body elements of a foamed plastic that are aligned next to each other in a plane and joined together.

The process is characterised by way of the following steps:
a) manufacture of closed-cell rod-shaped or column-shaped foamed plastic bodies;
b) welding together the long sides of the rod-shaped or column-shaped foamed bodies into a plastic block thus creating weld seams over that face, whereby the weld seams are then present as low-pore or pore-free intermediate plastic layers;
c) dividing the block of foamed plastic into individual large area structural elements, in particular foam sheets, running transverse or perpendicular to the longitudinal direction of the rod-shaped foam bodies, whereby the weld seams, as viewed in plan view of the structural element, form a network like structure of struts.

The rod-shaped or column-shaped foam bodies are preferably manufactured using an extrusion process. The orientation of the material of the foam bodies or body segments preferably is preferably stretched in the direction of extrusion. Thereby, in particular polymer chains exhibit stretching in the direction of extrusion as a result of the extrusion process. The stretching of the material effects an improvement in the mechanical properties, in particular the compressive strength in the direction of stretching.

The foam bodies or body segments also preferably exhibit a cell structure or cell arrangement that is oriented in the direction of extrusion. The oriented cell structures of the foam body contribute to an increase in the compressive strength of the structural element.

In another version of the invention the rod-shaped or column-shaped foam bodies may be taken from a prefabricated block of foam i.e. by cutting or sawing. The said block of foam is manufactured by means of an extrusion process.

According to a specific version of the invention the production of the foam bodies takes place via an extrusion process, whereby the foam body comprises a plurality of expanded polymer strands that are brought together. Drawing the strands together takes place immediately after leaving the extrusion die by expanding the individual strands. Thereby, neighbouring strands make contact with each other, grow together or stick together forming a foam body. The foam body is then in the form of a closed package of strands.

The strands lie preferably essentially parallel to each other and are arranged in the longitudinal or extrusion direction of the foam body. The manufacturing process may be arranged such that the individual strands remain visible in the foam body or are brought together or melted to give one single structure in which the individual strands are only slightly or no longer detectable. The strands are preferably packed together so tightly that the individual strands come to rest fully in contact with each other without forming any spaces. The strands may, however, also be arranged or packed together such that channel-like spaces are formed between the individual strands.

The strands are usefully created via an extrusion tool e.g. die plate, whereby the extrusion tool contains a plurality of neighbouring openings through which the polymer is extruded in the form of strands. In cross-section the said openings may be round e.g. circular or elliptical shaped, or polygonal e.g. rectangular, quadratic or hexagonal. The openings may also be in the form of slits. The foamed strands may have a diameter of e.g. 3 to 50 mm, in particular 4 to 20 mm.

Situated downstream of the extrusion die there may also be another shaping tool that specifies the outer contour of the foam body, in which tool the strands are packed together on emerging from the extrusion die, so that the foam body takes on the cross-sectional shape of the shaping tool.

With the above manufacturing process it is possible to produce rod-shaped or column-shaped foam bodies which have already been extruded with the desired cross-sectional shape and size so that the foam bodies can be cut to length individually or already in combination with further rod-shaped or column-shaped foam bodies into body segments or contain large area structural elements containing body segments.

Further, using the above manufacturing process it is possible to produce foam bodies of a cross-sectional size which is larger the required cross-section of rod-shaped or column-shaped foam bodies, so that in the subsequent processing steps the extruded foam body is cut into individual rod-shaped or column-shaped foam bodies, whereby the strands run essentially in the longitudinal direction of the cut rod-shaped or column-shaped foam bodies.

In a preferred version of the foam bodies or body segments manufactured according to the above described process the orientation of the individual strands of the body segments lies essentially perpendicular to the outer faces of the large area structural element made up of body segments. Thereby, as a result of the orientation of the strands, the compressive strength is preferably greater in the longitudinal direction of the strands i.e. in the direction of extrusion than in the other directions.

The foam bodies may be produced using physical or chemical foaming means. In a preferred version the foam bodies are foamed physically using $CO_2$. The introduction of the foaming agent may take place directly in the extrusion device.

In a preferred version of the invention the extruded foam bodies are welded into plastic blocks on their long sides i.e. along the long sides that come into contact with each other. Large area, in particular sheet-shaped structural elements are subsequently cut from these plastic blocks transverse or perpendicular to the long sides of the foam bodies.

The cutting of the large area structural elements out of the plastic blocks may be performed by sawing or using a thermal cutting process.

Instead of the above described process steps the foam bodies may also be already cut into body segments whereby the individual body segments are subsequently welded together to form large area structural elements.

The welding takes place preferably by melting the side faces of the body segments that are to be joined, followed by fitting these together and solidifying the molten zones.

In a preferred version means for controlling the melting process during welding are employed that allow weld seams of a specific thickness or thickness range to be produced, whereby the thickness range is selected such that the web-like strut structure of weld seams produces a stiffening effect on the plastic sheet.

The welding process is usefully one of thermoplastic welding. The production of the weld joint may take place by means of radiation welding or contact welding. Plastic welding processes that can be employed are e.g. welding with heating elements or infrared welding. The welding process may take place with or without weld-feed materials.

Compared to conventional foamed plastic sheets, the large area structural elements according to the invention exhibit greater stiffness and in particular greater compressive strength. The properties are due essentially to the weld seams between the individual body segments. The weld seams form a network of strut-like connections like a framework, whereby the weld seams are in the form of low-pore or pore-free, dense intermediate plastic layers.

The framework of strut-like connected weld seams increases the compressive strength as the struts forming the intermediate plastic layer are significantly less compressible than the foam body itself. If, for example, surface pressure is applied to the structural element according to the invention (e.g. in the case of a sandwich composite via the outer layers onto the structural element serving as core layer), then the compressive forces act mainly on the stiff strut-like structure and not on the foam bodies themselves.

The increase in stiffness of the structural element according to the invention is also a result of the framework-like nature of the weld seams which lead to an increase in the torsional and bend strength of the structural element.

The structural element according to the invention finds application preferably in composite elements, in particular composite sheets with at least one outer sheet on one side of the structural element.

The structural element according to the invention finds highly preferable application as core in sandwich composite elements, in particular sandwich composite elements with outer layers on both sides of the core layer. The sandwich composite elements may e.g. comprise a large area structural element according to the invention with an outer layer on both sides of the structural element. Further, it is also possible for there to be several layers on one or both sides of the structural element. If the structural element according to the invention is employed as a core layer in a sandwich composite sheet, the structural element is usefully a sheet element.

The said layers or outer layers may be joined to each other and/or to the core layer e.g. by adhesive joining means.

The outer layers may e.g. be rigid or flexible sheets of plastic or fibre reinforced plastic such as glass fibre reinforced plastic. Further, the outer layers may also be sheets of metal, in particular aluminium or an aluminium alloy. The outer layers are, in comparison with the core layer, usefully relatively thin sheets.

In spite of their low weight, sandwich composite elements with structural elements according to the invention exhibit a high degree of stiffness and excellent shear and compressive strength. Such sandwich structures are therefore suitable especially for applications which require components which are light in eight but structurally high load bearing.

Sandwich-type composite elements with structural elements according to the invention as core layer may e.g. be employed as construction elements in the building industry.

Examples of such construction elements are walls, floors, ceilings, doors, dividing walls or cladding elements.

Sandwich composite elements with structural elements according to the invention as core layer also find preferred application in transportation on land (e.g. road or railway vehicle manufacture), on water (e.g. ship and boat building, equipment for water sports) or in the air (e.g. aircraft construction). This may be e.g. sandwich composite elements according to the invention for trunk structures, loading platforms, walls, ceilings, floors, lids, cladding or parts thereof, on or as part of lorries or railway trucks for goods transport, or walls, ceilings, floors, intermediate walls, cladding elements, doors, lids or parts hereof, on vehicles for public transport such as omnibusses, trams, railway carriages or on ships such as passenger ships, ferries, pleasure steamers or boots.

The sandwich composite elements according to the invention may also find application in sports articles for use on land, water or air.

Sandwich composite elements with structural elements as core layer according to the invention are highly preferred for application as vanes or rotor-blades for wind powered generating units.

The invention is described in greater detail in the following by way of example and with reference to the accompanying drawings. These show in:

FIG. 1: an explosive view of a sandwich composite with a structural element according to the invention as core layer;

FIG. 2: a cross-section through a sandwich composite with a structural element according to the invention as core layer;

FIG. 3: plan view of a first version of structural element according to the invention;

FIG. 4: plan view of a second version of structural element according to the invention;

FIG. 5: plan view of a third version of structural element according to the invention;

FIG. 6: plan view of a fourth version of structural element according to the invention;

FIG. 7: plan view of a fifth version of structural element according to the invention;

FIG. 8: plan view of a sixth version of structural element according to the invention;

FIG. 9: perspective view of a plastic block for manufacturing structural elements according to the invention as shown in FIG. 5.

FIG. 1 shows a sandwich composite element 1 with a core layer of structural element according to the invention, which is in the form of a plastic sheet 10 (see also FIG. 3). The plastic sheet 10 is made up of block-shaped body segments 11 which are joined together at their touching side faces 17 via longitudinal and transverse weld seams 12, 13 that extend over the said side faces 17. The weld seams 12, 13 form thereby (as seen in plan view) a network-like, stiff structure of struts. Provided on each side of the core layer on the outer faces 16 of the body segments 11 is an outer layer 2, 3. The outer layers 2, 3 may be in the form of plastic sheets, fibre reinforced sheets (e.g. fibre-glass reinforced duroplastics or thermoplastics) or metal sheets, in particular aluminium sheets.

Figure 3:
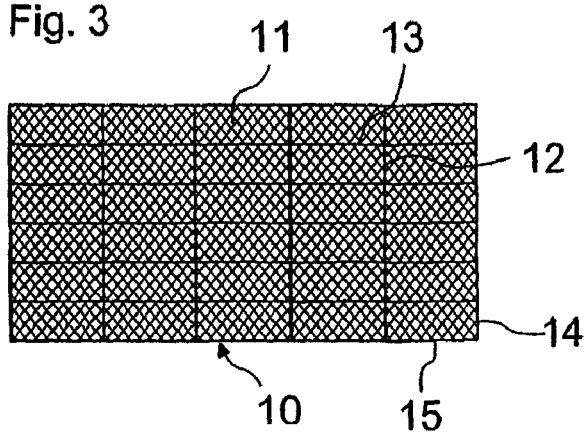
FIGS. 3 to 7 show various versions of structural elements according to the invention in the form of plastic sheets 10, 20, 30, 40, 50, 60 made up of body segments 11, 21, 31, 41, 51, 61, of different geometrical shapes and arrangement that are arranged lying next to each other.
Figure 4:
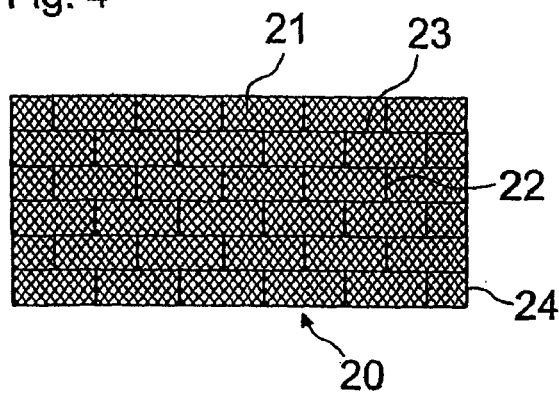

The plastic sheets 10, 20 shown in figures. 3 and 4 contain body segments 11, 21 of rectangular cross-section as viewed in plan view. The body segments 11 as shown in FIG. 3 are arranged in a plane next to each other in several rows 14 and columns 15, whereby the weld joints between the body segments 11 form a network-like structure of intersecting longitudinal and transverse weld seams 12, 13.

The body segments 21 shown in FIG. 4 are arranged in a plane next to each other in several rows 24 that are offset with respect to each other, whereby the weld joints form a structure that has the appearance of a brick wall with uninterrupted transverse weld seams 23 and longitudinal weld seams 22 that are offset with respect to each other.

Figure 5:
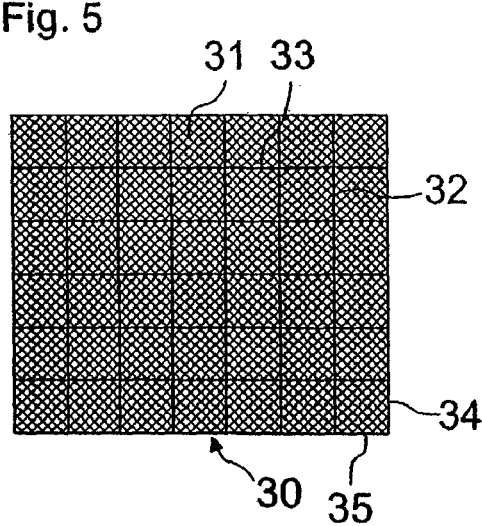
Figure 6:
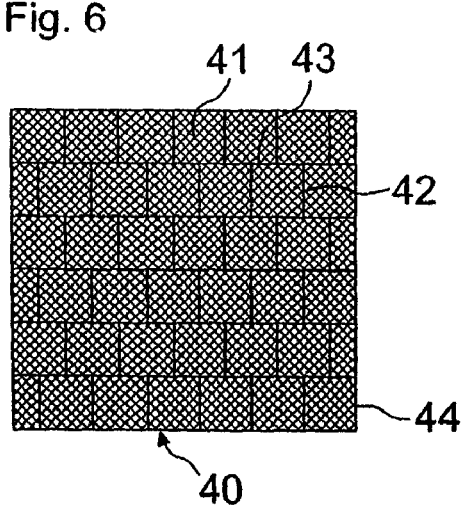

The plastic sheets 30, 40 shown in FIGS. 5 and 6 contain body segments 31, 41 of quadratic cross-section as viewing the sheet in plan view. The body segments 31 shown in FIG. 5 are arranged next to each other in a plane in several rows 34 and columns 35, whereby the weld joins form a network-like structure with intersecting longitudinal and transverse weld seams 32, 33.

The body segments 41 shown in FIG. 6 are arranged in a plane next to each other in offset rows 44, whereby the weld joins form uninterrupted transverse weld seams 43 and longitudinal weld seams 42 that are offset with respect to each other.

Figure 7:
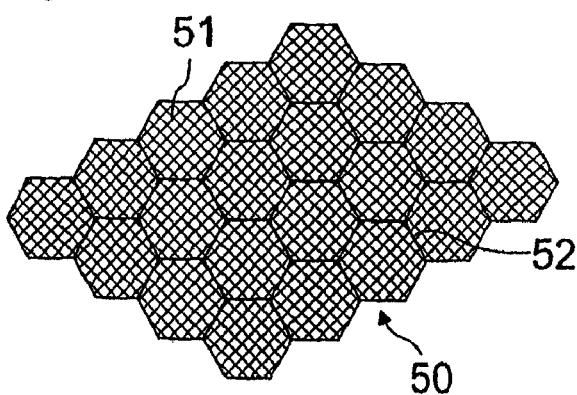

FIG. 7 shows a further version of a plastic sheet 50 having—as viewed in plan view—hexagonal i.e. web-shaped body segments 51 which are arranged on a plane next to each other and are welded together forming weld seams 52.

Figure 8:
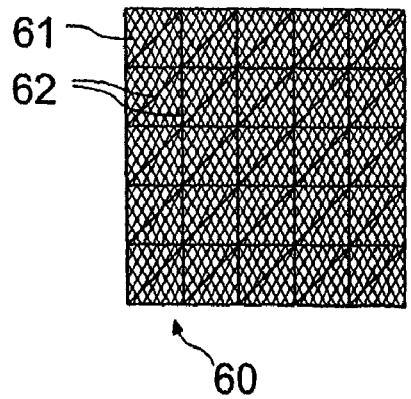

FIG. 8 shows another version of a plastic sheet 60 according to the invention having—as viewed in plan view—triangular body segments 61 which are arranged on a plane next to each other and are welded together forming weld seams 62.

Figure 1:
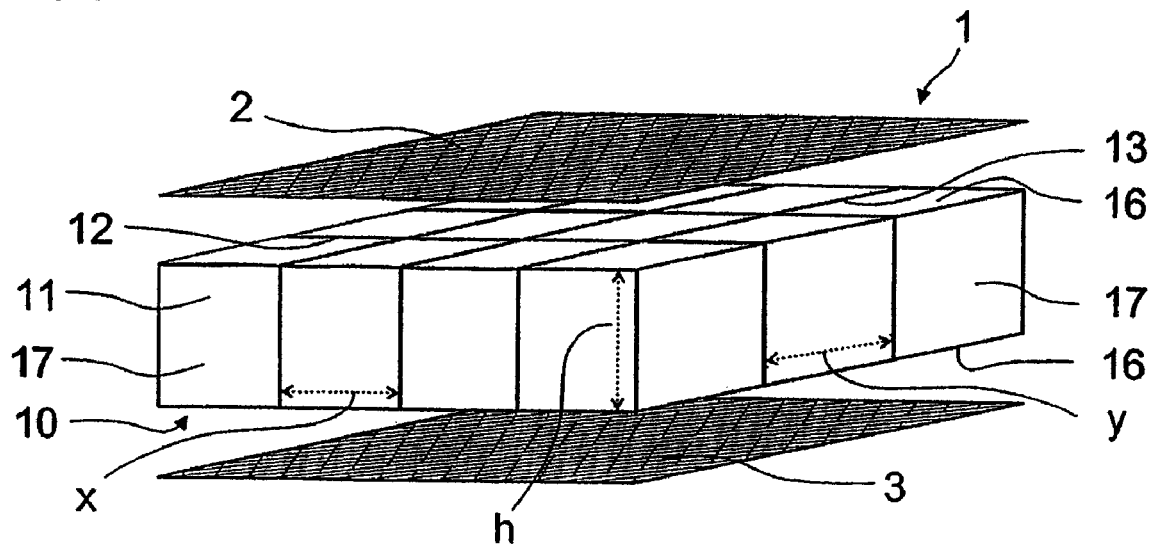
Figure 2:
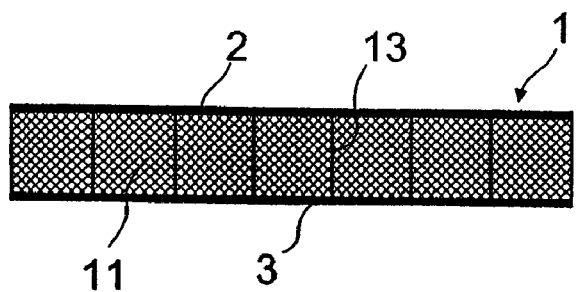
FIG. 2 shows a cross-sectional view of a sandwich composite element 1 as in FIG. 1. The outer layers 2, 3 are joined to the core layer by means of adhesive bonding.
Figure 9:
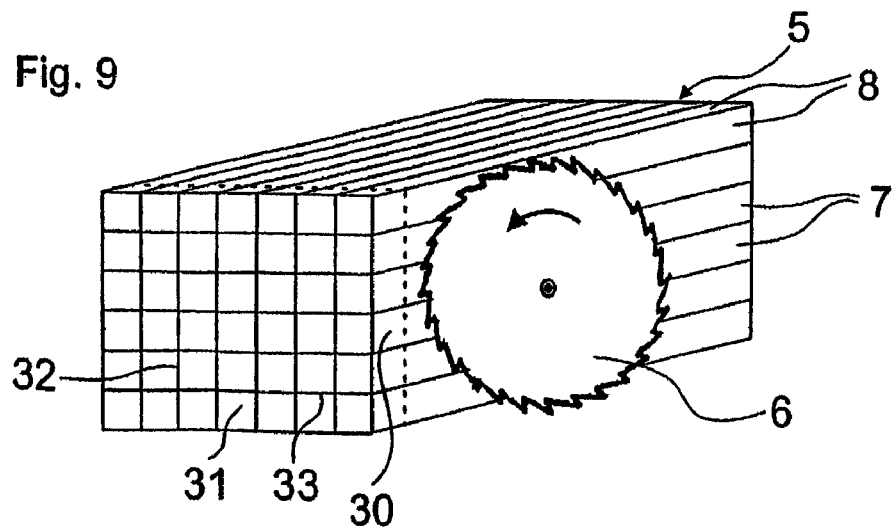

FIG. 9 shows a plastic block 5 made up of column-shaped or rod-shaped foam bodies 7, whereby the foam bodies 7 are manufactured e.g. by means of extrusion or by dividing a homogeneous block of foam. The individual foam bodies 7 are, according to the invention, joined together along their long sides 8 by plastic welding, forming longitudinal and transverse weld seams 32, 33 respectively.

By sawing or thermally cutting the plastic block 5 is divided into individual plastic sheets 30 according to the invention as shown in FIG. 5, whereby the plastic sheets 30 are made up of body segments 31 that are arranged next to each other on a plane.

The invention claimed is:

1. A vane or rotor blade for a wind powered generating unit, comprising:
    a structural element comprising a block which comprises a plurality of body segments of a foamed, thermoplastic material having a stretched polymer structure in one direction, the body segments being arranged next to each other and joined together on a plane defining foam sheets running transverse or perpendicular to the one direction of the stretched polymer structure, wherein the structural element is a plastic sheet having opposed relatively large area sides, and relatively small area edges, and where the stretched polymer structure is in a direction perpendicular to the relatively large area sides, wherein the structural element is made wholly of plastic and the body segments are welded together at abutting side faces forming weld seams, whereby the weld seams form a substantially pore-free intermediate plastic layer in the form of a network of stiffening struts defined by intersecting weld seams, wherein each of the weld seams have a thickness such that a network strut structure is formed by the weld seams which increases the compressive strength of the structural element with respect to surface pressure.

2. The apparatus of claim 1, wherein the body segments are made of a closed-cell foam material.

3. The apparatus of claim 1, wherein the thermoplastic material is polyethylene-terephthalate (PET) or styrene/acrylnitrile-copolymer (SAN).

4. The apparatus of claim 1, wherein the weld seams comprises melted plastic of the body segments.

5. The apparatus of claim 1, wherein the body segments are formed from lengths cut from rod-shaped or column-shaped foam bodies.

6. The apparatus of claim 5, wherein the rod-shaped or column-shaped foam bodies are formed by means of extrusion, and the direction of extrusion in the body segments manufactured from the foam bodies lies substantially parallel to a line of intersection of two intersecting weld seams.

7. The apparatus of claim 1, wherein the body segments have a polygonal shape.

8. The apparatus of claim 1, wherein the structural element (10) is a plastic sheet.

9. The apparatus of claim 1, wherein the weld seams form a structure with uninterrupted transverse weld seams and longitudinal weld seams that are offset with respect to each other.

10. The apparatus of claim 1, wherein the body segments are arranged on a plane next to each other and are welded together forming the weld seams.

* * * * *